United States Patent [19]

Iwata et al.

[11] 4,364,652

[45] Dec. 21, 1982

[54] AUTOMATIC FOCUSING CAMERA

[75] Inventors: Hiroshi Iwata, Nara; Wataru Hasegawa, Sakai, both of Japan

[73] Assignee: West Electric Co., Ltd., Osaka, Japan

[21] Appl. No.: 260,112

[22] Filed: May 4, 1981

[30] Foreign Application Priority Data

May 13, 1980 [JP] Japan ................................. 55-63618

[51] Int. Cl.$^3$ ...................... G03B 13/22; G03B 17/12
[52] U.S. Cl. .................................... 354/197; 354/286
[58] Field of Search ............... 354/195, 197, 198, 286; 352/140, 142; 367/101; 181/176

[56] References Cited

U.S. PATENT DOCUMENTS 4,199,246  4/1980  Muggli ................................ 354/195

Primary Examiner—William B. Perkey
Attorney, Agent, or Firm—Burgess, Ryan and Wayne

[57] ABSTRACT

An automatic focusing camera is provided with an ultrasonic distance measuring instrument capable of varying the directivity of an ultrasonic beam to be transmitted depending upon the angle of view of a photographic lens used. A plurality of circuit components one of which is selected so as to determine the oscillation frequency of an oscillator mounted in a camera body depending upon the angle of view of a photographic lens attached to the camera are mounted on the camera body, and a selecting means is mounted on the lens mount of a photographic lens at a position corresponding to the angle of view thereof so that when the photographic lens is attached to the camera body, its selecting means establishes an electrical connection of a predetermined one of said circuit components to said oscillator, whereby the latter oscillates at a predetermined frequency and consequently the ultrasonic beam transmitted has a predetermined directivity corresponding to the angle of view of the photographic lens.

5 Claims, 8 Drawing Figures

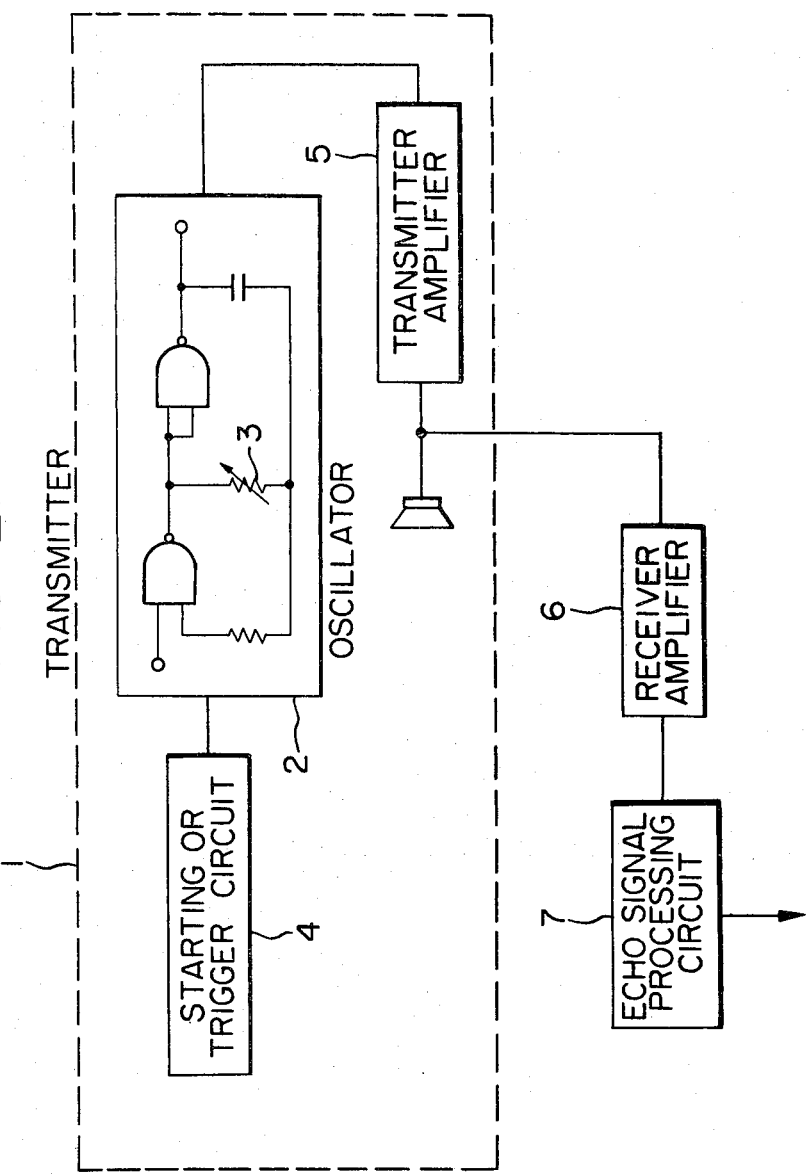

AUTOMATIC FOCUSING CAMERA

BACKGROUND OF THE INVENTION

The present invention relates to an automatic focusing camera.

There have been well known in the art the cameras such as those produced and marketed by Polaroid Co. Ltd. which are provided with an ultrasonic distance measuring instrument which produces the signal representative of a distance to a subject by measuring a time interval from the time when a pulse of ultrasonic sound is transmitted to the subject to the time when the pulse reflected from the subject is received. These cameras comprise a camera body and a photographic lens integral therewith, so that it is impossible to change the photographic lenses. As a result, the radiation or directivity pattern of the ultrasonic beam transmitted from the ultrasonic distance measuring instrument is uniquely determined depending upon the angle of view of the photographic lens used.

However, in the case of a camera which is provided with an ultrasonic distance measuring instrument and which permits the use of various interchangeable photographic lenses, if the directivity is uniquely determined depending upon the angle of view of a standard photographic lens, the correct distance measurement can be made with the standard lens, but when a photographic lens with a narrower angle of view is attached, the camera receives the echo reflected back from an object outside of the angle of view, so that the correct measurement of a distance to a subject cannot be attained and consequently an erratic measurement of distance results. On the other hand, if the directivity is determined depending upon the narrow angle of view of a telephoto lens, an erratic measurement of distance will result when a wide-angle lens is used.

SUMMARY OF THE INVENTION

The present invention was made to overcome the above problems and has for its object to provide an ultrasonic distance measuring instrument capable of varying the directivity of an ultrasonic beam transmitted depending upon the angle of view of an interchangeable lens used.

According to the present invention, mounted in a camera body are an oscillator and a plurality of circuit components one of which is selected so as to vary the oscillation frequency of the oscillator depending upon the angle of view of a photographic lens used. A selecting means is disposed on the lens mount of each interchangeable lens at a position corresponding to the angle of view thereof. When one of the photographic lenses is attached to the camera body, its selecting means selects a predetermined one of the circuit components so that an ultrasonic beam with directivity corresponding to the angle of view of the photographic lens attached may be transmitted to a subject.

The above and other objects, effects and features of the present invention will become more apparent from the following description of preferred embodiments thereof taken in conjunction with the accompanying drawings.

BRIEF DESCRIPTION OF THE DRAWINGS

FIG. 2A is a circuit diagram used for the explanation of varying the oscillation frequency of an oscillator depending upon the angle of view of a photographic lens used;

DESCRIPTION OF THE PREFERRED EMBODIMENTS

The present invention will be described in conjunction with the following group of interchangeable lenses.

| Type | Focal length | Angle of view |
|---|---|---|
| wideangle | 24 mm | 84° |
| standard | 50 mm | 47° |
| telephoto | 100 mm | 24° |

Figure 1:
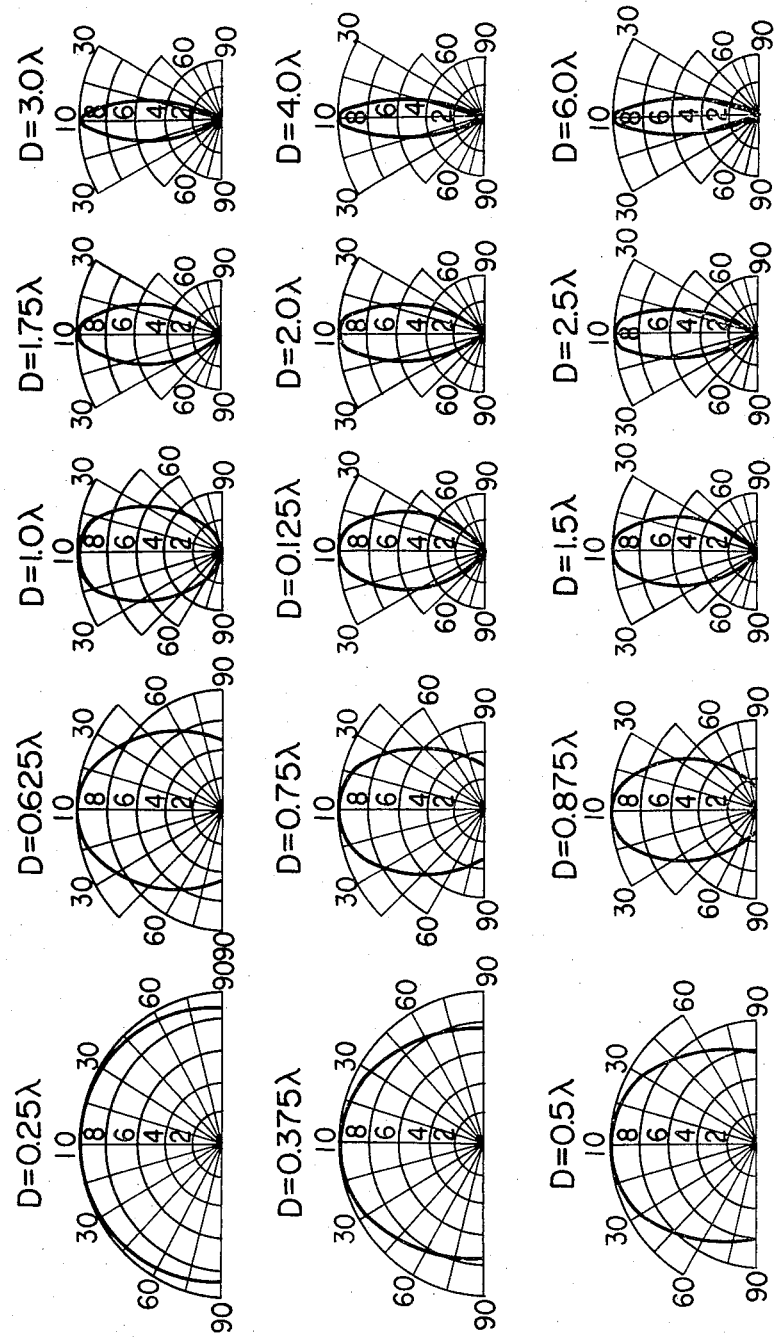
FIG. 1 shows the radiation or directivity patterns of ultrasonic beams transmitted from an ultrasonic transmitter.

Furthermore, it is assumed that the transmitter of an ultrasonic distance measuring instrument can change its radiation or directivity patterns as shown in FIG. 1 depending upon the ration $D/\lambda$, where D is the diameter of the diaphragm of the transmitter or transducer and $\lambda$ is the wavelength of ultrasonic sound waves transmitted. It is apparent from FIG. 1 that the higher the ratio $D/\lambda$; that is, the shorter the wavelength or the higher the frequency when the diameter D remains constant, the narrower the directivity becomes. Therefore, a suitable transducer is selected which has a suitable radiation or directivity pattern for the telephoto lens with the narrowest angle of view of 24° and when the standard or wide lens is used, the frequency is lowered or the diameter of the ultrasonic wave generator is reduced accordingly so that a suitable radiation or directivity pattern may be produced. Thus, one-to-one correspondence is established between the angle of a lens used and the radiation or directivity pattern or directivity. In practice, the directivity is selected to be smaller than the angle of view of a lens used because when the directivity and the angle of view are same, the correct measurement of a distance to a subject cannot be made when an object closer to the picture frame is closer to the camera than the subject at the center.

In general, the conventional ultrasonic distance measuring instruments are provided with a circular ultrasonic wave generator whose directivity is given by the following relation:

$$\text{Directivity} = \sin^{-1} 0.71 \, \lambda/D$$

Therefore, the ratio $D/\lambda$ becomes 3.41; 1.78 or 1.06 for the angle of view of 24°, 47° or 84°, respectively. When D is equal to 20 mm, $\lambda$ becomes 5.87; 11.24 and 18.86 mm or 57.9; 30.2 and 18.0 KHz in terms of frequency. In practice, however, errors occur, so that the directivity of the transmitter must be measured correctly.

In this embodiment, the frequency of the transmitter is changed to 57.9, 30.2 or 18.0 KHz depending upon the telephoto, standard or wide-angle lens mounted on the camera.

The frequency can be varied with a circuit as shown in FIG. 2A. That is, when the value of a variable resistor 3 in an oscillator 2 in a transmitter 1 is varied, the frequency of the ultrasonic waves transmitted from the transmitter is varied accordingly. The oscillator 2 is shown as comprising two NAND gates, a capacitor, a fixed resistor and the variable resistor 3, but it is to be understood that the present invention is not limited thereto and that any oscillator capable of varying its frequency by changing a circuit constant or interconnections may be used. In FIG. 2A, reference numeral 4 denotes a starting or trigger circuit; 5, a transmitter amplifier; 6, a receiver amplifier in the camera; and 7, an echo signal processing circuit. In response to the output signal from the processing circuit 7, the camera is automatically focused at a desired subject.

Figure 2B:
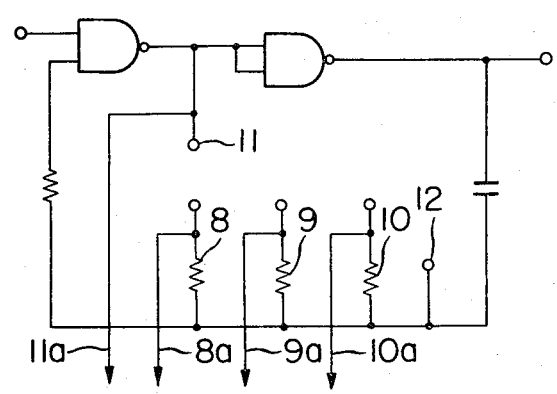
FIG. 2B is a circuit diagram of a first embodiment of the present invention.

In this embodiment, a frequency variable oscillator as shown in FIG. 2B is used which is an expansion of the oscillator shown in FIG. 2A. That is, instead of the variable resistor 3 used in the circuit shown in FIG. 2A, an array of resistors 8, 9 and 10 is used. Depending upon the lens mounted on the camera, one of the resistors 8, 9 and 10 is connected to a terminal 11 so that the oscillator oscillates at a predetermined frequency. More particularly, when the resistor 8, 9 or 10 is connected to the terminal 11, the frequency becomes 57.9; 30.2 or 18.0 KHz. One ends of the resistors 8, 9 and 10 are connected to terminals 8a, 9a and 10a, respectively, and a terminal 11a which is connected to the terminal 11 is disposed on a camera mount. These terminals 8a through 11a are so positioned that when the telephoto, standard or wide-angle lens is mounted on the camera, the terminal 8a, 9a or 10a is connected to the terminal 11a. As a result, the ultrasonic waves at a predetermined frequency corresponding to the mounted lens are transmitted. That is, the distance to a subject is measured with the ultrasonic beam with a predetermined directivity best suited for measurement.

The resistors 8, 9 and 10 may be embedded in the lens mounts, respectively, of the telephoto, standard and wide-angle lenses in such a way that when the lenses are mounted on the camera, their resistors bridge between the terminals 11 and 12.

Figure 3:
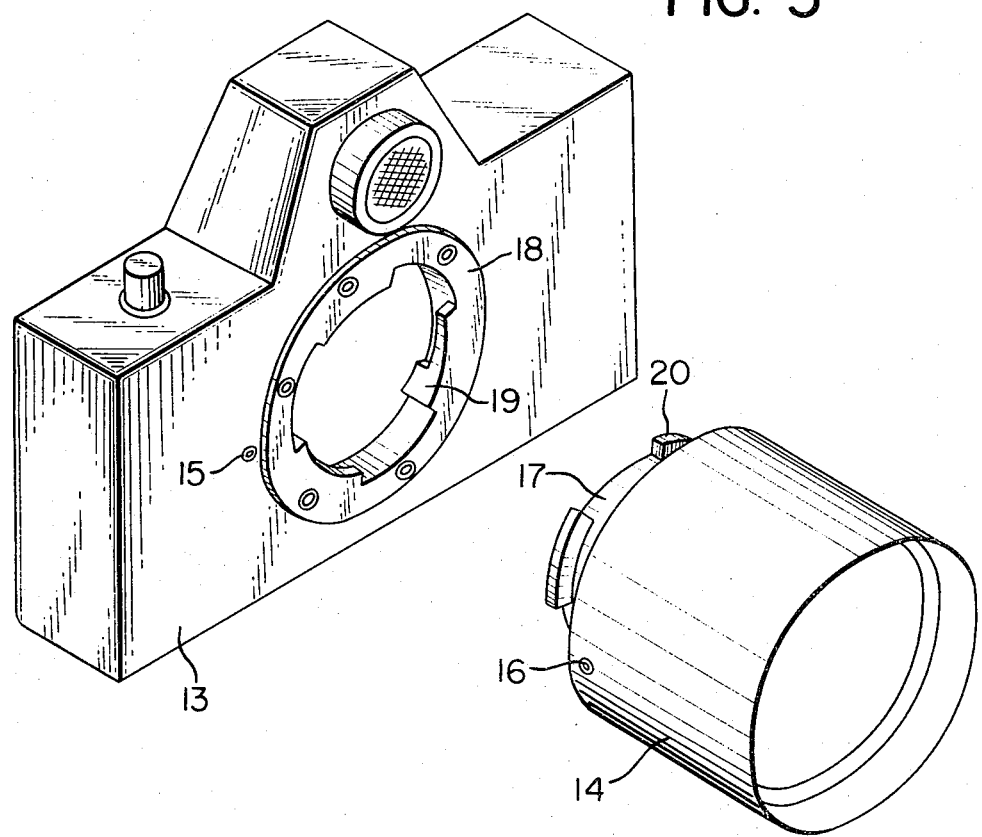
FIG. 3 is a perspective view of the first embodiment of the present invention.

Referring next to FIG. 3, the attachment of an interchangeable lens 14 to a camera 13 will be described. First, the lens mount 17 of the lens 14 is fitted into the lens receiving opening of the camera 13 in such a way that a mark 15 on the camera 13 is aligned with a mark 16 on the lens 14. Then, the lens 14 is rotated in the clockwise direction so that prongs 20 of the lens mount 17 engage with corresponding undercut grooves 19 in a camera mount 18. To remove the lens 14, the steps are reversed. Although not shown, the camera mount 18 is, of course, provided with a lens locking mechanism which forms no part of the present invention.

The camera mount 18 and the lens mounts 17 of the telephoto, standard and wide-angle lenses are shown in detail in FIG. 4. The terminals 8a through 11a (See FIG. 2B) are embedded into the camera mount 18 as shown in FIG. 4A, angularly spaced apart from each other by 60° and electrically isolated from the camera mount 18.

Figure 4A:
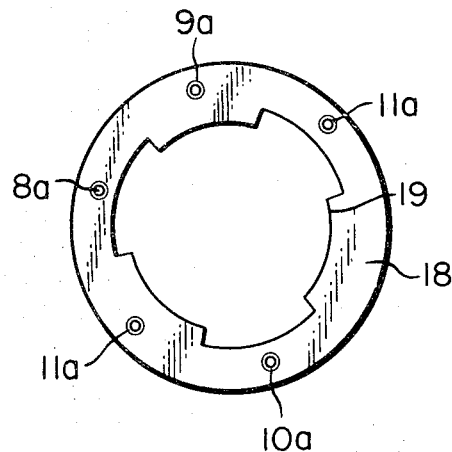
FIGS. 4A through 4D are top views of the mounts of a camera body and a telephoto, a standard and a wide-angle lens.
Figure 4B:
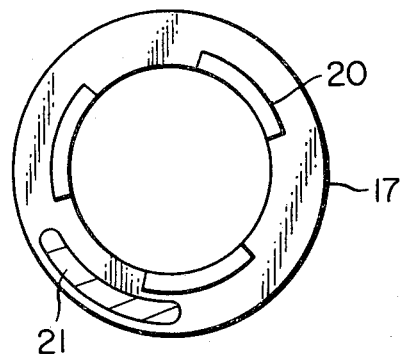
Figure 4C:
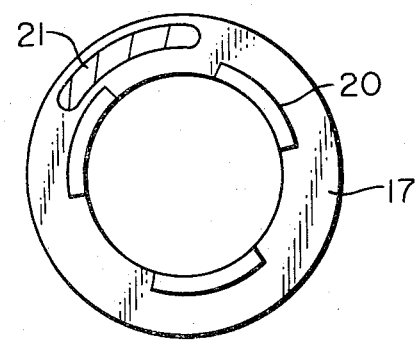
Figure 4D:
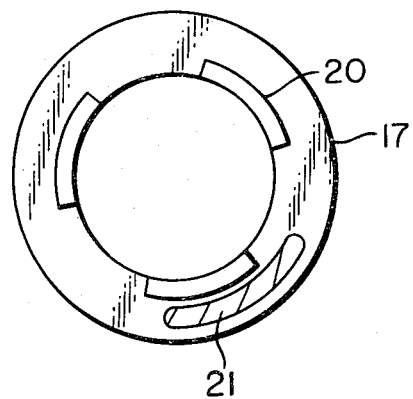

An arcuate short-circuiting element 21 whose subtended central angle is equal to 60° is embedded in the lens mount 17 of the telephoto lens as shown in FIG. 4B in such an angular position that when the telephoto lens is attached to the camera in the manner described above, the short-circuiting element 21 is made into contact with the terminals 8a and 11a on the mount 18 of the camera. As a result, the resistor 8 (See FIG. 2B) is inserted into the oscillator so that the latter oscillates at 57.9 KHz as described previously.

In like manner, the standard and wide-angle lenses are provided with arcuate short-circuiting elements 21. Therefore, when the standard or wide-angle lens is attached to the camera, its short-circuiting element 21 bridges between the terminals 9a and 11a or between the terminals 10a and 11a so that the oscillator oscillates at 30.2 or 18.0 KHz.

In summary, the angular positions of the short-circuiting elements 21 on the lens mounts 17 of the telephoto, standard and wide-angle lenses are varied so that when one of the lenses is mounted on the camera, a predetermined pair of terminals 11a and 8a; 11a and 9a; or 11a and 10a are connected.

Alternatively, the terminals 8a, 9a and 10a are connected to the common terminal 12 (See FIG. 2B) and instead of the short-circuiting elements 21, the resistors 8, 9 and 10 are attached to the lens mounts 17 of the telephoto, standard and wide-angle lenses in a manner substantially similar to that described above, so that when one lens is mounted on the camera, its resistor 8, 9 or 10 interconnects between the terminal 11a on the one hand and the terminal 8a, 9a or 10a and hence the terminal 12 on the other hand. Further, for omitting the resistors 8, 9 and 10, it is preferable that, for example, the terminal 8a is interconnected with the common terminal 12 and resistors positioned at the same position as that of the short-circuiting element 21 as shown in FIG. 4B are used, the resistances of which correspond to the angles of views of used lenses, respectively.

The present invention is not limited to the positions of the terminals 8a through 11a and the short-circuiting elements 21 as shown in FIGS. 4A through 4D, but their positions may be suitably selected in such a way that erratic connections may be avoided and reliable connections may be ensured.

The present invention may be equally applied to zoom lens. That is, the variable resistor 3 in the oscillator 2 (See FIG. 2A) is varied depending upon a selected zooming position so that the directivity of the ultrasonic beam can be varied depending upon a selected angle of view.

What is claimed is:
1. An ultrasonic transmitter for use in an ultrasonic ranging system for a camera capable of accepting various interchangeable lens assemblies having corresponding various angles of view, comprising:
   an ultrasonic generator, the directivity of which varies with the ultrasonic frequency generated thereby;
   a camera mount for receiving a selected one of said lens assemblies;
   frequency determining means operatively associated with said camera mount and adapted to be coupled to said selected one of said lens assemblies when the selected assembly is received by said camera mount, for establishing a frequency control parameter corresponding to the angle of view of said selected lens assembly; and
   ultrasonic frequency control means coupled to said ultrasonic generator and responsive to said fre- quency control parameter for setting the ultrasonic frequency of said generator in accordance with the angle of view of said selected lens assembly, so that the directivity of said ultrasonic generator corresponds to the angle of view of said selected lens assembly.

2. The ultrasonic transmitter according to claim 1, wherein said frequency determining means comprises a frequency determining circuit of an oscillator, said circuit comprising a first electrical circuit portion operatively associated with said camera mount, and a second electrical circuit portion secured to said selected lens assembly and adapted to be connected in circuit with said first electrical circuit portion when said selected lens is received by said camera mount.

3. The ultrasonic transmitter according to claim 2, wherein said selected lens assembly comprises a variable focal length zoom lens, said second electrical circuit portion including a variable impedance element for adjusting said frequency determining circuit to vary said ultrasonic frequency in response to variation of the focal length of said zoom lens.

4. The ultrasonic transmitter according to claim 2, wherein said frequency determining circuit comprises a plurality of resistors, said first electrical circuit portion comprises corresponding terminals connected to respective ones of said resistors, and said second electrical circuit portion comprises resistor selecting means for coupling at least one of said resistors in circuit to control the frequency of said oscillator.

5. The ultrasonic transmitter according to claim 4, wherein said resistor selecting means comprises a short-circuiting means disposed on a lens mount of said selected lens assembly for interconnecting selected terminals of said first electrical circuit portion.

* * * * *